June 5, 1928.

L. V. CROW 1,672,114

VALVE

Filed Dec. 13, 1927

INVENTOR.
Leroy V. Crow
BY Harry A. Totten
ATTORNEY.

Patented June 5, 1928.

1,672,114

UNITED STATES PATENT OFFICE.

LEROY V. CROW, OF CLOVERDALE, CALIFORNIA.

VALVE.

Application filed December 13, 1927. Serial No. 239,638.

The present invention relates to improvements in valve casing structures, and more particularly to valve casings for valve controlled fluid conduits for medical apparatus.

The invention has for its principal object to provide a valve body for medical irrigating apparatus, which when used for certain purposes, will be operated by muscular reaction of the patient to automatically control the valve operation thereof.

Another object is to provide a medical appliance which is simply constructed, is capable of being thoroughly sterilized and is readily adapted for the purpose designed.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings disclosing my invention—

Figure 1:
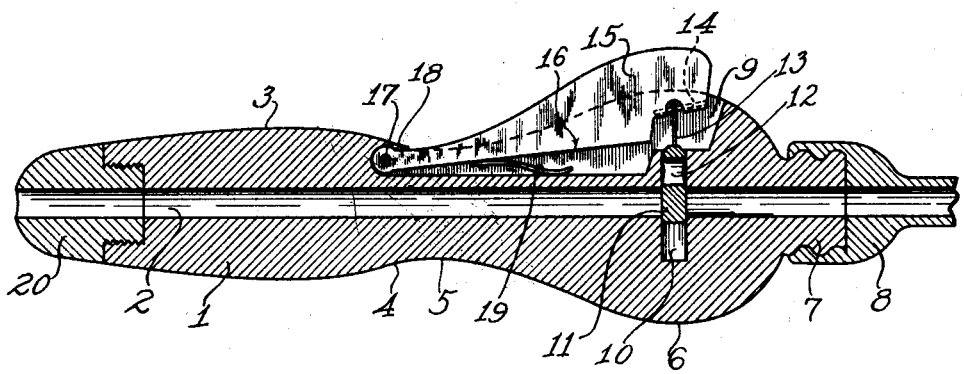
Figure 1 is a horizontal sectional view of the preferred embodiment of my invention.

Referring to the several views of the drawings, wherein like characters of reference designate corresponding parts, 1 designates an elongated cylindrical body having an axial bore 2. The body 1 gradually tapers or swells outwardly, as at 3, from its insertion end, then recedes in a graceful curve 4, to a point 5, where the extreme diameter corresponds approximately to that of the diameter of the insertion end of the body. From the point 5 the body again swells or enlarges toward its rear end to the point 6, which affords a handle grip, and is appreciably larger than the forward portion of the body. From the point 6, the body wall curves abruptly inwardly and the body terminates in a relatively small tube attaching projection 7, to which is secured a tube 8, preferably of flexible structure.

In its side wall the body is formed with an elongated, longitudinally extending radial slot 9, which commences at a point slightly in advance of the point 5 of the body and terminates at a point within the hand grip portion 6. The base of the slot parallels the bore 2, as illustrated.

Intersecting the bore 2 and communicating at one end with the base of the slot 9, is a valve chamber 10 in which is movably mounted a slide valve 11, provided in its body with an aperture 12, adapted on the inward reciprocation of the valve to align with the bore 2 and permit fluid flow therethrough.

Outwardly from the valve 11 extends a stem 13, formed at its end with an eye through which extends a pin 14 carried by the free end of a valve operating lever 15, positioned within the slot 9. The lever 15 has a straight edge 16, and its outer edge is curved to follow the outline of the surface of the body 1, exteriorly of the slot 9. The forward reduced end of the lever 15 is pivotally mounted within the forward end of slot 9 by fulcrum pin 17, and the lever is limited in its outward swinging movement by contact with the overhanging stop wall 18. A suitable spring 19 normally forces the lever 15 outwardly and maintains the valve in bore closing position.

In the present embodiment, the body 1 carries at its insertion end a removable tip 20, which admits of other tips being substituted therefor, dependent on the purpose for which the appliance is to be used.

It will be observed that when the present appliance is employed for an enema, the rectal muscle will be extended on the insertion of the body and will contract about the body when the insertion is completed, so that the muscle encircles the reduced portion 5 of the body.

When in this position, the action of the muscle tends to force the lever 15 inwardly and maintain the valve 11 open. On the application becoming uncomfortable to the patient, the tendency is to expel the body 1 by muscular action, and such action imparts longitudinal movement to the body 1, causing the same to be slightly ejected from the aperture, which withdraws the action of the rectal muscle from the lever 15, enabling the spring 19 to force the lever outwardly and close valve 11.

Figure 2:
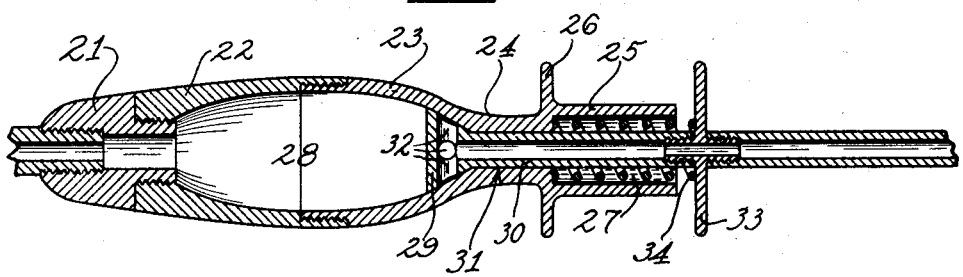
Figure 2 is a similar view of a modified structure.

In the embodiment illustrated in Fig. 2, the same contour is afforded to the insertion end of the body as is illustrated in Fig. 1. However, in this structure the body consists of a tip 21 threaded into the forward section of a chambered body 22, which forward section is connected with the chambered rear section 23, the latter tapering to a reduced portion 24 corresponding to the reduced portion 5 of the body 1, in Fig. 1.

The portion 23 is formed with a tubular extension 25 radially of which, beyond the reduced portion 24, projects a stop flange 26. The rear portion of the extension 25 is chambered as at 27. Within the chamber 28 of the sections 22 and 23 is mounted the valve head 29, carried on the end of a tubular stem 30, reciprocably mounted within the bore 31 in the section 23, the bore of said stem opening laterally, as at 32, in the side wall of the head 29.

Threaded to the extreme end of the stem 30 is a coupling carrying a radial disc 33 against which bears a valve seating spring 34 coiled about the stem 30 within the chamber 27.

It will be observed that when pressure is applied to the members 26 and 33 to force the same toward each other and compress spring 34, valve 29 will be unseated, permitting a fluid flow through the body, and on pressure being released from said members, spring 34 will separate the same and cause the valve 29 to seat.

This apparatus, like that in Fig. 1, is also adapted for use as a catheter, and when introduced in a canal or passage, the stop wall 26 abuts against the canal or passage opening and enables the user to operate the valve by pressing inwardly and releasing the member 33.

I claim:—

1. In combination with a cylindrical elongated valve body provided with a longitudinal disposed open ended bore, the surface of said body gradually curving outwardly from its opposite ends and then curving inwardly toward its center, providing enlarged end portions, one of a greater circumference than the other and a central portion of relatively small diameter, a valve controlling the fluid flow through the bore in said body, and a valve operating member disposed longitudinally of the surface of the body and connected with said valve.

2. In combination with a cylindrical elongated valve body provided with a longitudinally disposed open ended bore, the surface of said body gradually curving outwardly from its opposite ends and then curving inwardly toward its center, providing enlarged end portions, one of a greater circumference than the other and a central portion of relatively small diameter, said valve body provided with a longitudinal slot extending across the relatively small diameter of the central portion of the body, a lever fulcrumed at one end within the end of said slot adjacent the end of said body of smallest diameter, the surface of said lever conforming to the contour of the edge of the slot, a valve mounted to control the fluid flow through said body bore, and a connection between the valve and lever.

3. In combination with a cylindrical elongated valve body provided with a longitudinally disposed open ended bore, the surface of said body gradually curving outwardly from its opposite ends and then curving inwardly toward its center, providing enlarged end portions, one of a greater circumference than the other and a central portion of relatively small diameter, said valve body provided with a longitudinal slot extending across the relatively small diameter of the central portion of the body and further provided with a valve channel intersecting the open ended bore and communicating at its outer end with said slot adjacent one end, a lever fulcrumed at one end within the end of said slot adjacent the end of said body of smallest diameter, the surface of said lever conforming to the contour of the edge of the slot, a valve mounted for reciprocation in said valve channel to control the fluid flow through said bore, a connection between said valve and said lever, a stop for limiting the outward pivotal movement of the lever, and a spring within the slot bearing on the lever for normally maintaining the valve in bore closing position.

In testimony whereof I have signed my name to this specification.

LEROY V. CROW.